Dec. 27, 1960  M. J. BLES  2,966,180
TREE STUMP CUTTING AND SPLITTING APPARATUS
Filed Aug. 8, 1958

INVENTOR.
MARCUS J. BLES,
BY
McMorrow, Berman & Davidson
ATTORNEYS.

United States Patent Office 2,966,180
Patented Dec. 27, 1960

2,966,180

TREE STUMP CUTTING AND SPLITTING APPARATUS

Marcus J. Bles, McLean, Va.

Filed Aug. 8, 1958, Ser. No. 753,966

1 Claim. (Cl. 144—2)

The present invention appertains to a new and novel means for cutting, splitting and removing tree stumps and roots and constitutes an improvement over my pending applications, Serial No. 708,287, filed January 10, 1958, now Patent Number 2,934,108, and Serial No. 713,873, filed February 7, 1958, now Patent Number 2,934,109.

In my pending applications, an apparatus for cutting and slicing tree stumps is disclosed which includes a mobile frame having a boom pivotally mounted thereon and a tool vertically disposed and pivotally mounted on the outer end of the boom and movable in a vertical plane by an actuating means, which may be a cable operating and winch means on the mobile frame or a hydraulic operating means.

It has been found, after considerable use of the apparatuses, which are disclosed in my pending applications, that a scissors action can be realized in the movement of the pivoted boom and the tool, with the results that a better cutting action can be achieved and movement of the mobile frame relative to the tree stump or the tool, as the tool cuts or slices into the tree stump, can be prevented. Such scissors action is realized by the relative arrangement between the pivot point of the tool on the outer end of the boom and the sheaves which are disposed above and below the pivot point and connected to the operating cable means that operatively extends from the winch means on the mobile frame. Because of such arrangement of the pivot point and the upper and lower sheaves, it has been found that the operating force is transmitted to the tool in swinging the tool so as to bring the lower cutting end into cutting or slicing engagement with the tree stump and also is transmitted back through the boom to the mobile frame so as to cause the frame to literally sit down on the ground and prevent any forward movement on the frame relative to the tree stump or the tool, as the tool cuts or slices into the tree stump.

Accordingly, an important object of the present invention resides in the provision of a tree stump cutting, splitting and removing apparatus, wherein movement of the mobile frame, which carries the boom for the tool and the operating means for swinging the tool about the outer end of the boom, is prevented from moving relative to the tree stump being cut or to the tool, as the tool cuts or slices into the tree stump.

Ancillary to such object, a meritorious feature of the present invention resides in the provision of a tool, which has a shank portion, having upper and lower ends, on which sheaves are mounted for engagement with the cable operating means, and having the pivot connection between the shank portion and the outer end of the boom disposed at least above the center point of the shank portion between the upper and lower sheaves. It has been found that the pivot point must be disposed above the center portion between the upper and lower sheaves, in order to achieve the effect of transmitting the force back through the boom to the mobile frame, as well as transmitting part of the force to the lower cutting end of the tool in effecting the cutting and slicing action. Preferably, the pivot point between the boom and the shank portion of the tool is arranged well above the center point and subjacent to the upper sheaves.

Another important object of the present invention resides in the provision of a tree stump cutting, splitting and removing tool, which includes a shank portion having a cutting end portion provided on the lower end thereof, the cutting end portion being formed with a concave leading or cutting edge for effecting the vertical slice through the tree stump and the lower end of such cutting end portion being provided with a laterally outstanding cutting blade, which has its outer edge formed as a cutting edge so as to effect a horizontal slice or cut through the tree stump simultaneous with the vertical cut; the vertical and horizontal cutting edges having a common leading cutting point, which is disposed in a vertical line passing through the axes of the upper and lower sheaves on the shank portion. By virtue of the disposition of the leading cutting point for the vertical and horizontal cutting edges in alignment with the axes of the sheaves on the shank portion, the initial cut into the tree stump is made on the downward swinging movement of the tool.

Accordingly, an important object of the present invention resides in the provision of a tool and the arrangement of the cutting edges thereon and the relative arrangement of the sheaves for the operating cable so as to effect the slicing or cutting of the tree stump on the downward swinging movement of the tool. This tends to exert a downward push on the tree stump, as the cutting edges slice into the tree stump, which downward push is resisted by the roots, thereby effecting a quicker, cleaner and more effective slicing or cutting of the standing tree stump.

The foregoing and ancillary objects, including the provision of a more economical, more efficient and faster operating tree stump cutting, slicing and removing apparatus, are attained by the present invention, the preferred embodiment of which is set forth in the following description and illustrated in the accompanying drawing, wherein.

Figure 1:
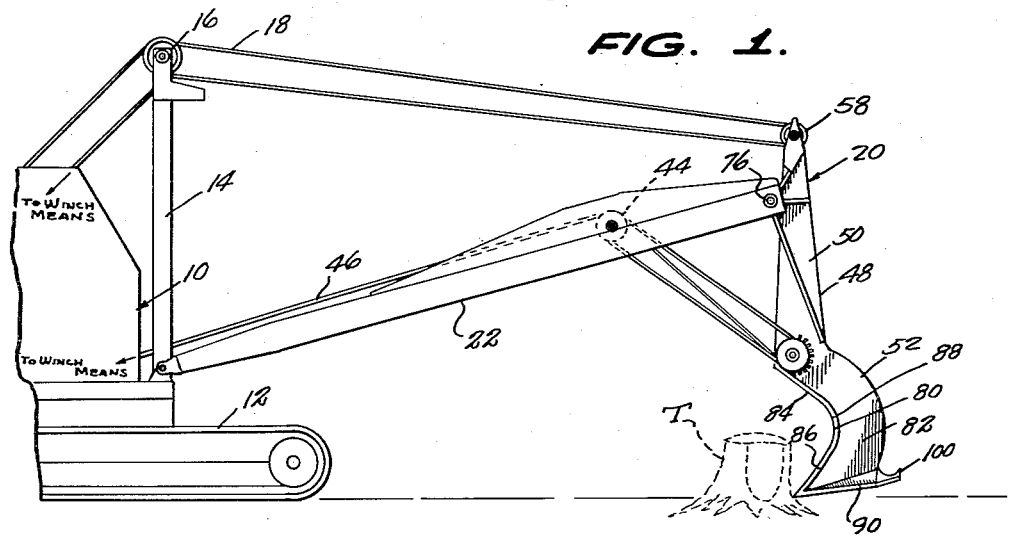
Figure 1 is a side elevational view of the tree stump cutting, slicing and removing device, showing the same in structural association with a mobile frame, which may be of any suitable construction and which, in the present instance, is shown, for exemplary purposes only, as being of the caterpillar type.
Figure 2:
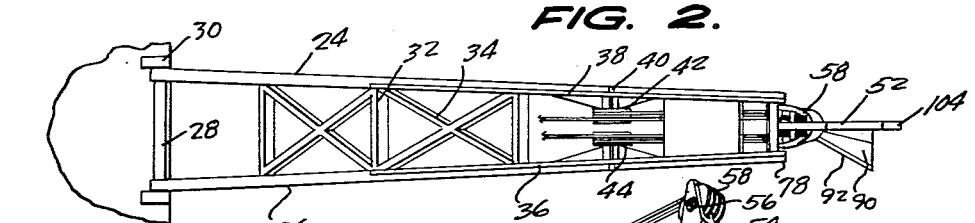
Figure 2 is a top plan view thereof.
Figure 3:
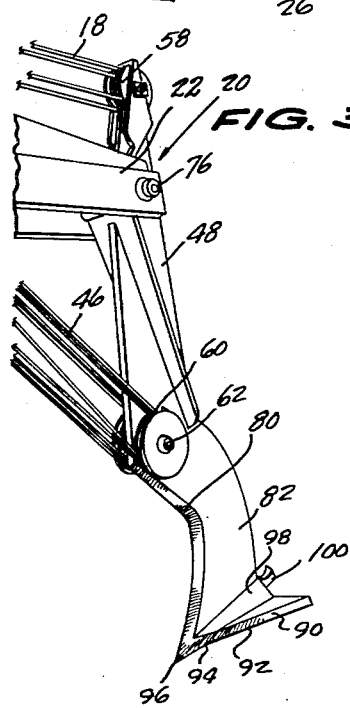
Figure 3 is a perspective view of the tool per se, showing fragmentary portions of the boom and operating cable means and looking from the frame towards the tool; and, Figure 4 is a fragmentary perspective view of the cutting tool, showing the boom and cable operating means fragmentarily and looking towards the mobile frame.
Figure 4:
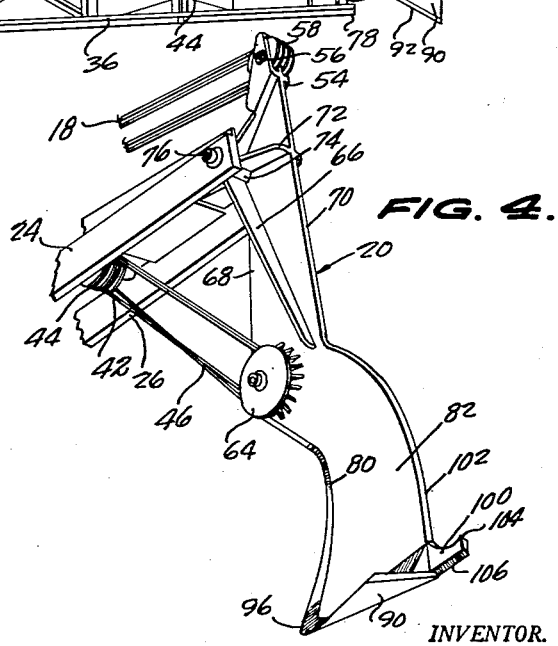

Referring now more particularly to the accompanying drawing, and initially to Figure 1, the reference numeral 10 generally designates a mobile frame, which may be of any suitable construction and which is provided with a winch means (not shown). In the present instance, the frame is shown as mounted on tracks 12 so as to be of the caterpillar type but, obviously, any movable frame construction may be used.

A mast 14 upstands from the frame and sheaves 16 are suitably journalled on the upper end thereof, with operating cables 18 benig reeved on the sheaves and suitably passed to the winch means.

The tree stump cutting and slicing apparatus 20 of the present invention includes a boom 22, which is composed of outwardly convergent side bars 24 and 26. The inner ends of the side bars are pivotally mounted by a pivot rod 28, that is journalled between opposed, upstanding ears 30 provided on the frame. Suitable cross braces 32 are provided between the side bars 24 and 26, with diagonally crossed reinforcing and bracing bars 34 also being provided for the purpose of spacing the side bars 24 and 26 apart and rigidifying them.

Webs 36 and 38 upstand from the upper edges of the side bars, adjacent their outer ends, and, intermediate the ends of the webs, a shaft 40 is journalled for the purpose of rotatably supporting sheaves 42 and 44.

The sheaves 42 and 44 have operating cables 46 entrained thereon, which cables are passed rearwardly to the winch means on the mobile frame.

The apparatus 20 further includes a cutting tool 48, which comprises an upper shank portion 50 and a lower cutting end portion 52. The shank portion 50 is formed at its upper end with a yoke 54, the sides of which support a shaft 56 for the sheaves 58, over which the operating cables 18 are entrained.

Sheaves 60 are rotatably disposed on the opposing sides of the shank portion and mounted on a shaft 62, which is passed transversely through the shank portion, at the lower end thereof, the sheaves being enclosed by housings 64. The operating cables 46 are entrained over the sheaves 60 which are disposed at the lower end of the shank portion.

Thus, the shank portion is provided adjacent its upper and lower ends with sheaves, which are connected to the operating cables 18 and 46 for the purpose of swinging the tool about the outer end of the boom 22.

In this respect, the shank portion is provided on its opposing sides with reinforcing webs 66, which extend from the outer or front edge 68 of the shank portion upwardly and downwardly toward the rear edge 70 of the shank portion. A transverse web 72 joins the webs 66, intermediate the upper and lower sheaves and above the center point between the upper and lower sheaves and more adjacent the upper sheaves, as shown in Figure 1, than the lower sheaves 60. At the juncture point between the webs, a sleeve 74 is transversely formed and supports a rod 76 which is suitably attached to the outer ends 78 of the side bars 24 and 26 of the boom, whereby the tool is pivotally attached to the boom.

It is to be particularly noted that the pivot point 76 of attachment of the shank portion of the tool to the outer end of the boom is disposed above a center point between the upper and lower sheaves 58 and 60 and, preferably, is disposed intermediate the center point and the upper sheaves 58.

The lower cutting end 52 of the tool is formed with a concave or arcuate vertical cutting edge 80, which may be in the form of a removable edge section welded to the curved body portion 82 of the lower cutting end. The vertical cutting edge 80 includes a downwardly and inwardly directed upper edge portion 84 and an upwardly and inwardly directed lower edge portion 86, the edge portions being joined as at 88, by a juncture portion of suitable curvature.

The lower end of the body portion 82 of the lower cutting end 52 is provided with a horizontal plate 90, which laterally extends outwardly from one side of the body 82 and which is formed with an outer cutting edge 92. The plate is of substantially triangular shape in plan view, with the front end 94 of the cutting edge blending in with the lower end of the vertical cutting edge 80. A brace webbing 98 is provided to reinforce the plate.

A duck tail hook portion 100 extends rearwardly from the rear edge 102 of the body portion 82 and is formed with the hook 104. The lower edge 106 thereof is sharpened to form a cutting edge and such cutting edge is disposed coplanar with the cutting edge 92 and in the same plane with the cutting point 96.

It is to be particularly noted that the cutting point 96, which is disposed at the juncture between the lower end of the vertical cutting edge and the forward end of the horizontal cutting edge, is disposed in a vertical line which intersects the axes of the upper and lower sets of sheaves 58 and 60. The cutting point 96 is provided in such relationship so that, as seen in Figure 1, the initial cut is made on the down swing of the tool, thereby imposing a downward push on the tree stump T, which push is resisted by the roots, whereby a more effective and easier slicing and cutting through the tree stump is realized.

In use, the operating cables 46 are drawn inwardly by the winch means so as to swing the tool about the pivot 76, with the cutting end 96 initially slicing into the tree stump and being followed by the vertical and horizontal cutting edges 80 and 92, with the final cut being made by the cutting edge 106 on the duck tail.

Because of the arrangement of the pivot 76, which is disposed above the center point between the upper and lower sheaves 58 and 60, part of the force is transmitted back through the boom 22 to the mobile frame, with part of the force being imparted to the cutting end of the tool, as it is forced through the tree stump to effect the vertical and horizontal cut or slice. By providing the pivot point 76 at the center point or above, with relation to the upper and lower sheaves, an equal amount of push is transferred back through the boom to the mobile frame, whereby a down pressure is imposed on the frame, so as to cause the frame to sit down and prevent the frame from moving forward relative to the tree stump or the tool, as it slices or cuts through the tree stump. Thus, there is an equal amount of stay power on the mobile frame as there is swinging or pulling power on the tool, as it is swung rearwardly into the tree stump. This is, in effect, a scissors action between the boom and the tool, whereby the mobile frame is prevented from moving or being pulled toward the tree stump.

The hook 104 on the duck tail is used to force standing portions of the tree stump upwardly, as the tool is swung in a counter-clockwise direction, subsequent to the clockwise swing of the tool into cutting or slicing engagement with the tree stump.

It is to be particularly noted that the cutting edges are disposed in relationship with the sheaves and the shank portion of the tool so that vertical and horizontal slices and cuts are made in the tree stump on the downward swing of the tool. In this fashion, the tree stump is sliced or cut into pieces and the entire stump is demolished, without creating an unfilled hole and without requiring the subsequent bulldozing operation, as is conventionally necessitated.

In using the tool, the first slice is usually alongside the standing tree stump to cut the imbedded roots from the stump and subsequently the tool is swung into the tree stump, advancing the tool from one side of the stump to the other and cutting the stump into slices. After the stump is entirely cut, all that remains are large chips and the dirt flows right back into the hole, left by the demolished tree stump.

While the preferred embodiment of this invention has been illustrated and described herein, other forms may be realized as coming within the scope of the appended claim.

What is claimed is:

In combination with a mobile frame having operating cable means, a tree stump cutting and splitting apparatus comprising a boom pivotally mounted at one end on the frame for vertical swinging movement and having an opposing outer end, a tool vertically disposed at the outer end of the boom and having an upper shank portion and a lower cutting end portion on the shank portion, upper and lower sheave means mounted on the shank portion adjacent the upper and lower ends thereof and operatively connected to the operating cable means, and means pivotally attaching the shank portion to the outer end of the boom at a point above the center point between the upper and lower sheave means, said lower cutting end portion being curved and having a concave leading vertical cutting edge terminating in a lower free cutting point touching a line intersecting the axes of the upper and lower sheave means with the line paralleling the shank portion of the tool, and said cutting end portion having a horizontally disposed plate laterally outstanding from the lower end thereof and having an outer cutting edge converging toward and meeting with the lower free cutting point, and a tail portion extending rearwardly from the lower end thereof and having an upper hook edge and a lower cutting edge coplanar with the cutting edge on the horizontally disposed plate.

References Cited in the file of this patent

UNITED STATES PATENTS

| | | |
|---|---|---|
| 790,464 | Toler | May 23, 1905 |
| 1,369,954 | Beasley | Mar. 1, 1921 |
| 1,391,131 | Lynch et al. | Sept. 20, 1921 |
| 1,919,075 | Rasmussen | July 18, 1933 |
| 2,388,461 | Baker | Nov. 6, 1945 |
| 2,495,052 | Cole | Jan. 17, 1950 |
| 2,528,170 | Peacock | Oct. 31, 1950 |
| 2,701,591 | Kissner et al. | Feb. 8, 1955 |
| 2,895,236 | Pilch | July 21, 1959 |

FOREIGN PATENTS

| | | |
|---|---|---|
| 936,605 | Germany | Dec. 15, 1955 |
| 1,000,628 | Germany | Jan. 10, 1957 |